United States Patent Office 3,799,790
Patented Mar. 26, 1974

3,799,790
METAL CARBIDE SPHERULES ENCAPSULATED WITHIN A PYROLYTIC CARBON SHELL
David Arthur Schulz, Fairview Park, Ohio, and Charles Lamar Turner, Cornwell Heights, Pa., granted to the United States Atomic Energy Commission under the provisions of 42 U.S.C. 2182
No Drawing. Filed Sept. 10, 1970, Ser. No. 71,209
Int. Cl. B44d *1/02;* G21c *3/20*
U.S. Cl. 117—37 R                          16 Claims

ABSTRACT OF THE DISCLOSURE

A process for producing nuclear fuel particles having a fissionable metal carbide spherule encapsulated within a protective pyrolytic carbon shell having an inner diameter greater than the outer diameter of the enclosed spherule which comprises depositing a layer of aluminum oxide on a fissionable metal carbide spherule, pyrolyzing a hydrocarbon gas and depositing the pyrolytic carbon thereby produced so as to form a substantially uniform porous coating on the aluminum oxide layer, and then heating the coated particle so as to volatilize and diffuse the aluminum oxide layer through the porous carbon coating, leaving a void between such coating and the metal carbide spherule. After the aluminum oxide layer has been diffused through the porous pyrolytic carbon coating, a denser high-strength protective coating of pyrolytic carbon can be applied to the spheroid.

BACKGROUND OF THE INVENTION

(1) Field of the invention

This invention relates to a process for producing articles having a refractory substrate and a protective pyrolytic carbon coating wherein at least part of the interface between the refractory substrate and the carbon coating is interrupted by a void volume. This invention is especially suitable for producing nuclear fuel particles having a fissionable metal carbide spherule encapsulated within a protective pyrolytic carbon shell having an inner diameter greater than the outer diameter of the enclosed spherule. For the sake of convenience, the invention will generally be described with reference to the production of such nuclear fuel particles rather than with reference to its more broader aspects.

(2) Description of the prior art

The use of nuclear reactors at the high temperatures at which they are most efficient requires encasing the fissionable fuel used in such reactors in a refractory substance substantially impermeable to fission products in order to minimize the escape of fission products and avoid corrosion, as well as to protect the fuel. However, due to the difference between the coefficients of expansion of such coatings and the fissionable materials, and the pressure produced by accumulation of fission products, it is difficult to provide coatings which do not crack when heated to the extremely high temperatures employed in such reactors, e.g. up to the temperature required to melt the fissionable materials.

In U.S. Letters Patent 3,151,037 it has been proposed to solve this problem by providing a nuclear fuel particle wherein a spherule of a normally solid fissionable material is enclosed within a spherical substantially impermeable shell of a refractory material in which the interior volume of the shell is greater than the volume of the enclosed spherule at all temperatures below the point at which the refractory shell itself is destroyed by heat. The space between the fissionable material and the outer shell provides room for the free expansion of the contents of the shell and for the containment of volatile fission products, thereby minimizing the pressure on the outer shell.

One means for producing such particles proposed in that patent is to coat a spherical particle of uranium metal with a resinous material which is subsequently carbonized, coated with pyrolytic carbon, and then heated to a temperature sufficiently elevated to cause it to react with the uranium to produce uranium carbide, thereby leaving a space between the outer pyrolytic carbon shell and the uranium carbide produced by the reaction. However, since the uranium carbide is produced by the addition of the encapsulated uranium to the carbon of surrounding coating, the interior surface of the shell can become contaminated with a residue of fissionable material and a large part of the remaining fissionable material migrates into the shell itself.

SUMMARY OF THE INVENTION

In accordance with the instant invention a novel process is provided for producing nuclear fuel particles having a void volume between the refractory shell and the enclosed fuel, which process does not result in the migration of the fuel into the encapsulating shell. Such process comprises depositing a layer of aluminum oxide ($Al_2O_3$) on a fissionable metal carbide spherule, pyrolyzing a hydrocarbon gas and depositing the pyrolytic carbon thereby produced so as to form a substantially uniform porous coating on the aluminum oxide layer, and then heating the coated particle so as to volatilize and diffuse the aluminum oxide layer through the porous carbon coating, leaving a void between such coating and the metal carbide spherule. The size of the void desired in the particles determines the thickness to which the aluminum oxide coating is allowed to deposit, while the pyrolytic carbon is deposited in a thickness which will allow the aluminum oxide to diffuse therethrough while still providing a protective coating over the metal carbide. Since the process does not involve a reaction of the refractory shell with the encapsulated material, no migration of fissionable material into the shell takes place.

DESCRIPTION OF THE PREFERRED EMBODIMENT

Any refractory substrate which is solid and nonreactive at the temperature at which the aluminum oxide layer is volatilized can be employed in the process of the instant invention. When producing nuclear fuel particles wherein the interior volume of the encapsulating shell is greater than the volume of the enclosed spheroid a fissionable metal carbide spherule is employed, i.e., uranium carbide, plutonium carbide, thorium carbide or uranium (thorium) carbide. If desired, materials such as zirconium carbide, which are not themselves nuclear fuels, can be admixed with the fissionable metal carbide to impart chemical and thermal stability to the fuel. In order to provide a substrate for the coating operation which will promote higher-strength deposits, the metal carbide is employed in the form of a spherule. The spherules can be produced in any desired manner, e.g. attrition, snowballing, pack-melting, sol-gel, shot tower, plasma torch, etc. Typically, such spherules have a diameter of from about 30 to about 300 microns.

The metal carbide spherules (or other refractory substrates) are coated with aluminum oxide in any suitable manner. Preferably, the spherules are heated in a heating zone in an atmosphere of aluminum chloride vapor, water vapor and an inert gas at a temperature above that at which aluminum chloride vapor and water vapor react to form aluminum oxide. If desired, an aluminum alkoxide, such as aluminum trimethode, aluminum triethodide, aluminum triisopropoxide, and the like, may be substituted for the aluminum chloride. The reaction which takes place between the aluminum chloride and the water vapor can be illustrated by the following equation:

$$(AlCl_3)_2 + 3H_2O \rightarrow Al_2O_3 + 6HCl$$

The size of the void desired in the final encapsulated product determines the thickness to which the aluminum oxide coating is allowed to deposit. The thickness of the coating is typically from about 2 microns to about 10 microns.

The aluminum chloride and water must, of course, be employed in amounts sufficient to generate enough aluminum oxide to produce the desired coating. The inert gas is used to transport the water vapor and aluminum chloride vapor into the reaction zone. Both the aluminum chloride and water can be preheated to increase the degree of saturation of these materials in the inert carrier gas. Typically the water is heated to a temperature of from about 70° C. to about 100° C. and the aluminum chloride is heated to a temperature of from about 160° C. to about 200° C.

The aluminum oxide coating should be deposited at a temperature at which the metal carbide spherule (or other refractory substrate) is solid and below which the metal carbide will react with the aluminum oxide to prevent the coating from being consumed as it is deposited. Generally, when employing aluminum chloride, coatings of aluminum oxide can be deposited at temperatures of from about 800° C. to about 1500° C., with temperatures of from about 900° C. to about 1100° C. being preferred. When an aluminum alkoxide is employed, temperatures of from about 200° C. to about 800° C., preferably from about 400° C. to about 600° C., are suitable. In order to achieve a uniform coating on the spherules, it is preferred to maintain them in motion while the aluminum oxide is being deposited, e.g., by slowly dropping the spherules through the deposition zone, by vibrating a suitable deposition receptacle containing the spherules, by tumbling the spherules, by rotation of the deposition zone, or by fluidizing a bed of the spherules using an inert gas such as helium.

After the aluminum oxide coating has been applied to the metal carbide spherules (or other refractory substrate) they are further coated with porous pyrolytic carbon by heating the spherules in a heating zone in an atmosphere of an inert gas and a gaseous hydrocarbon at a temperature above the pyrolytic decomposition temperature of the hydrocarbon. The pyrolytic carbon is deposited in a thickness which will provide a protective coating for the metal carbide but not prevent the diffusion of aluminum oxide through it. The protective coating is typically about 5 microns to about 15 microns in thickness.

The pyrolytic carbon coating should be applied at a temperature at which the metal carbide spherule (or other refractory substrate) and aluminum oxide layer thereon is solid and below which the aluminum oxide will react with the pyrolytic carbon to prevent the coating from being consumed as it is deposited. Generally, tough coatings of pyrolytic carbon can be applied at temperatures of from about 800° C. to about 2000° C., with temperatures of from about 1000° C. to about 1300° C. being preferred. In order to achieve a uniform coating on the spherules, it is preferred to maintain them in motion while the pyrolytic carbon is being deposited, e.g., by slowly dropping the spherules through the deposition zone, by vibrating a suitable deposition receptacle containing the spherules, by tumbling the spherules, by rotation of the deposition zone, or by fluidizing a bed of the spherules using an inert gas such as helium.

Any hydrocarbon gas which will pyrolyze to provide free carbon atoms at a temperature at which the metal carbide spherule (or other refractory substrate) and aluminum oxide layer thereon is solid and below which the aluminum oxide will react with the deposited coating can be employed. Suitable hydrocarbons include aromatic hydrocarbons such as benzene; aliphatic hydrocarbons such as the alkanes, e.g., methane, ethane, propane, butane and the like; the alkenes, e.g., ethylene, propene, butene, pentene and the like; the alkylenes, e.g., acetylene; cycloaliphatic hydrocarbons such as cyclobutane, cyclopentane, cyclohexane, can also be used. The inert gas is mixed with the hydrocarbon gas in a volume ratio of from about 0.2:1 to about 7:1.

After the porous pyrolytic carbon coating has been deposited, the coated metal carbide spherules (or other refractory substrates) are then heated in an inert atmosphere at a temperature sufficiently elevated to volatilize the aluminum oxide layer and diffuse it through the porous carbon coating. Heating is continued until the aluminum oxide vapor has had an opportunity to diffuse through the porous coating, leaving a void between such coating and the metal carbide particle enclosed therein. The temperature employed should be high enough to volatilize the aluminum oxide layer and diffuse it through the pyrolytic carbon coating but low enough to prevent ruptures of the coating by such vapor as it diffuses through such coating. Such temperatures will depend upon the thickness of the aluminum oxide layer and the strength, thickness, sphericity and uniformity of the carbon coating. Generally, temperatures of from about 2000° C. to about 2400° C., preferably from about 2100° C. to about 2200° C., are suitable. Vacuum heat-treating of the particles tends to facilitate removal of the aluminum oxide. The temperature should not be permitted to exceed that at which reaction occurs between the aluminum oxide and the metal carbide.

After the aluminum oxide layer has been diffused through the porous pyrolytic carbon coating, a denser, high-strength protective coating of pyrolytic carbon can be applied to the spheroid (or other refractory substrate). The conditions for the application of the second coating are similar to those applicable for the first coating, except that the temperatures and ratio of inert gas to hydrocarbon gas are varied to produce a denser, stronger coating. Temperatures of from about 1900° C. to about 2500° C., preferably from about 1900° C. to about 2100° C., together with volume ratios of inert gas to hydrocarbon gas of from about 2:1 to about 150:1 are suitable. The second coating is typically about 5 microns to about 50 microns in thickness.

As a result of the process described, a particle is obtained which typically consists of a fissionable metal carbide spherule surrounded by two distinct layers of spherically-conforming pyrolytic carbon, the innermost layer of pyrolytic carbon having an inner diameter greater than the outer diameter of the enclosed metal carbide. The process can also be used to produce objects having complicated internal geometry wherein it is desirable to introduce gaps, voids or channels, e.g., in the production of heat exchangers, by depositing and vaporizing aluminum oxide on only a part of the surface of the substrate.

If a low density porous layer is desired bewteen the pyrolytic carbon shell and the enclosed metal carbide spherule rather than a complete void, pyrolytic carbon may be co-deposited on the metal carbide spherules together with the aluminum oxide, so that when the aluminum oxide is diffused through the outer porous carbon shell, a low density layer of pyrolytic carbon remains between the shell and the metal carbide rather than a complete void. Co-deposition of aluminum oxide and porous pyrolytic carbon may be effected by introducing a gaseous hydrocarbon into the heating zone together with the water vapor, aluminum chloride vapor and inert gas and heating at a temperature sufficiently elevated to pyrolyze the hydrocarbon gas as well as react the aluminum chloride and water vapor so as to co-deposit a mixture of aluminum oxide and pyrolytic carbon on the metal carbide spherules. Generally such coatings are applied to a thickness of from about 2 microns to about 10 microns at temperatures of from about 800° C. to about 1500° C., preferably from about 900° C. to about 1100° C. The aluminum chloride and water vapor are employed in amounts sufficient to generate enough aluminum oxide to produce the desired coating. The hydrocarbon gas, of a type described above, is employed in a volume ratio of from about 10:1 to about 2:1 with respect to the aluminum chloride. The relative amounts of hydrocarbon gas, aluminum chloride and water employed will determine the density of the carbon coating once the aluminum oxide is diffused out. Densities of from about 1.0 gram/cc. to about 1.3 grams/cc. are preferred. Diffusion of the aluminum oxide through the outer porous carbon shell is effected in the manner described above.

The following example is set forth for purposes of illustration only so that those skilled in the art may better understand this invention, and it should be understood that it is not to be construed as limiting the invention in any manner.

EXAMPLE 1

Six (6) grams of pyrolytic carbon coated tantalum carbide spheroids having an average diameter of 45 microns were coated with a substantially uniform layer of aluminum oxide ($Al_2O_3$) to an average thickness of 6 microns. Coating was effected in a one-inch diameter fluid bed coating furnace by the reaction of aluminum chloride vapor and water vapor in the presence of argon. The argon was used to transport the water and aluminum chloride into the furnace by passing separate streams of this gas through these materials before introducing the streams into the furnace. The water was preheated to a temperature of 75° C. and the aluminum chloride was preheated to a temperature of 200° C. The total rate of flow of the argon through the aluminum chloride and water was 2 s.c.f.m. The furnace temperature was maintained at 1000° C. and the procedure was continued for 15 minutes. During this time a coating of aluminum oxide, produced by the reaction of the aluminum chloride and water vapor, deposited on the spheriods to a thickness of 6 microns. HCl produced by the reaction was exhausted from the furnace.

The aluminum oxide coated particles were then transferred to a two-inch diameter graphite tube fluid bed coating furnace where they were fluidized by an argon gas stream and coated with a layer of pyrolytic carbon by the decomposition of acetylene. The temperature of the furnace was maintained at 1000° C. The flow rate of the argon through the furnace was 5.0 s.c.f.m. while the flow rate of the acetylene was 2.7 s.c.f.m. Pyrolysis of the acetylene gas was allowed to continue for 5 minutes during which time a substantially uniform layer of porous pyrolytic carbon was deposited on the aluminum oxide-coated spheriods to an average thickness of 3 microns.

After the coated particles had cooled, they were heated in a graphite tube furnace at 2200° C. for about 12 hours to effect removal of the aluminum oxide interlayer by diffusing it through the pyrolytic carbon coating.

After the aluminum oxide had been completely diffused through the porous pyrolytic carbon coating, a dense second coating of pyrolytic carbon was applied to the particles to an average thickness of 12 microns. The second coating was applied at a temperature of about 2000° C. using a mixture of helium and methane in the same two-inch diameter fluid bed coating furnace used to apply the inner coating. The flow rate of the helium was 6.0 s.c.f.m. while the flow rate of the methane was 0.04 s.c.f.m. Pyrolysis was allowed to continue for 15 minutes.

In a similar manner, particles of pyrolytic carbon coated zirconium carbide, tungsten carbide and titanium carbide were encapsulated within a pyrolytic carbon shell having an inner diameter greater than the outer diameter of such particles. Particles of plutonium carbide, uranium carbide, torium carbide, and uranium (thorium) carbide may likewise be encapsulated.

EXAMPLE 2

Particles having a low density porous layer between the pyrolytic carbon shell and the enclosed spherule were prepared in a manner similar to that of Example 1 except that pyrolytic carbon was codeposited with the aluminum oxide layer by the pyrolysis of acetylene while the aluminum oxide was being applied. The conditions were the same as those described in Example 1 except that the flow rate of the argon during the codeposition was 1.5 s.c.f.m. and acetylene was added at a rate of 0.1 s.c.f.m. The codeposition was allowed to continue for 30 minutes.

What is claimed is:

1. A process for producing articles having a refractory substrate and a pyrolytic carbon coating wherein at least part of the interface between the refractory substrate and the carbon coating is interrupted by a void volume which comprises depositing a layer of aluminum oxide on part of the surface of said refractory substrate, heating the thus coated refractory substrate in an atmosphere of an inert gas and a gaseous hydrocarbon at a temperature above the pyrolytic decomposition temperature of the hydrocarbon so as to pyrolyze the hydrocarbon gas and deposit a substantially uniform porous coating of pyrolytic carbon on the refractory substrate in a thickness which will not prevent the diffusion of aluminum oxide through it, heating the coated article so produced at a temperature sufficiently elevated and for a period of time sufficient to volatilize the aluminum oxide layer and diffuse it through the porous carbon coating so as to leave a void between such coating and the refractory substrate on those portions of the refractory substrate formerly covered by the aluminum oxide.

2. A process as in claim 1 wherein the aluminum oxide layer is deposited on the surface of the refractory substrate by heating the substrate in an atmosphere of aluminum chloride vapor, water vapor and an inert gas at a temperature above that at which aluminum chloride and water react to form aluminum oxide so as to react said aluminum chloride and water and deposit a layer of aluminum oxide thereon.

3. A process as in claim 1 wherein the aluminum oxide layer is deposited on the surface of the refractory substrate by heating the substrate in an atmosphere of aluminum alkoxide vapor, and an inert gas at a temperature above that at which the aluminum alkoxide decomposes so as to deposit a layer of aluminum oxide thereon.

4. A process as in claim 3 wherein the aluminum alkoxide is aluminum triisopropoxide.

5. A process for producing nuclear fuel particles having a fissionable metal carbide spherule encapsulated within two spherically conforming pyrolytic carbon shells in which the interior volume of the inner shell is greater than the volume of the enclosed spherule which comprises depositing a layer of aluminum oxide on a solid fissionable metal carbide spherule, heating the thus coated spherule in an atmosphere of an inert gas and a gaseous hydrocarbon at a temperature above the pyrolytic decomposition temperature of the hydrocarbon so as to pyrolyze the hydrocarbon gas and deposit a substantially uniform porous coating of pyrolytic carbon on the spherule in a thickness which will provide a protective coating for the metal carbide but not prevent the diffusion of aluminum oxide through it, heating the coated particle so produced at a temperature sufficiently elevated and for a period of time sufficient to volatilize the aluminum oxide layer and diffuse it through the porous carbon coating so as to leave a void between such coating and the metal carbide spherule, and depositing a second dense substantially uniform and impermeable coating of spherically conforming pyrolytic carbon about the porous pyrolytic carbon coating by heating the particle so produced in an atmosphere of an inert gas and a gaseous hydrocarbon at a temperature above the pyrolytic decomposition temperature of the hydrocarbon so as to pyrolyze the hydrocarbon gas and deposit pyrolytic carbon on such particle.

6. A process as in claim 5 wherein the aluminum oxide layer is deposited on the solid fissionable metal carbide spherule by heating the spherule in an atmosphere of aluminum chloride vapor, water vapor and an inert gas at a temperature above that at which aluminum chloride and water react to form aluminum oxide so as to react said aluminum chloride and water and deposit a layer of aluminum oxide thereon.

7. A process as in claim 5 wherein the aluminum oxide layer is deposited on the solid fissionable metal carbide spherule by heating the spherule in an atmosphere of aluminum alkoxide vapor, and an inert gas at a temperature above that at which the aluminum alkoxide will decompose and deposit a layer of aluminum oxide thereon.

8. A process as in claim 7 wherein the aluminum alkoxide is aluminum triisopropoxide.

9. A process as in claim 6 wherein the aluminum oxide is deposited at a temperature of from about 800° C. to about 1500° C.

10. A process as in claim 9 wherein the porous coating of pyrolytic carbon is produced employing a volume ratio of inert gas to gaseous hydrocarbon of from about 0.2:1 to about 7:1 and the hydrocarbon gas is pyrolyzed at a temperature of from about 800° C. to about 2000° C., the second coating of pyrolytic carbon is produced employing a volume ratio of inert gas to gaseous hydrocarbon of from about 2:1 to about 150:1 and the hydrocarbon gas is pyrolyzed at a temperature of from about 1900° C. to about 2500° C., and the aluminum oxide layer is diffused through the porous carbon coating at a temperature of from about 2000° C. to about 2400° C.

11. A process as in claim 10 wherein the hydrocarbon gas employed is selected from the group consisting of acetylene and methane.

12. A process as in claim 5 wherein the fissionable metal carbide spherule is selected from the group consisting of uranium carbide, plutonium carbide, thorium carbide, and uranium (thorium) carbide.

13. A process as in claim 6 wherein the fissionable metal carbide spherule is selected from the group consisting of uranium carbide, plutonium carbide, thorium carbide, and uranium (thorium) carbide.

14. A process as in claim 9 wherein the fissionable metal carbide spherule is selected from the group consisting of uranium carbide, plutonium carbide, thorium carbide, and uranium (thorium) carbide.

15. A process as in claim 10 wherein the fissionable metal carbide spherule is selected from the group consisting of uranium carbide, plutonium carbide, thorium carbide, and uranium (thorium) carbide.

16. A process as in claim 11 wherein the fissionable metal carbide spherule is selected from the group consisting of uranium carbide, plutonium carbide, thorium carbide and uranium (thorium) carbide.

References Cited
UNITED STATES PATENTS

| | | | |
|---|---|---|---|
| 3,290,223 | 12/1966 | Blocher et al. | 117—100 B |
| 3,284,549 | 11/1966 | Ford et al. | 176—91 R |
| 3,249,509 | 5/1966 | Blocher et al. | 117—100 B |
| 3,211,812 | 10/1965 | Johnson et al. | 264—0.5 |
| 3,165,422 | 1/1965 | Stoughton et al. | 117—69 |
| 3,081,249 | 3/1963 | Whittemore Jr. | 117—100 B |

ALFRED L. LEAVITT, Primary Examiner

M. F. ESPOSITO, Assistant Examiner

U.S. Cl. X.R.

117—45, 46 EG, 62, 69, 100 B, 102 R, 106 R; 176—69, 82, 91, 91 SP; 264—0.5